Jan. 5, 1926.

E. A. FLORENCE 1,568,821

SELF LOCKING NUT

Filed August 19, 1925

E. A. Florence,
INVENTOR

BY Victor J. Evans
ATTORNEY

Patented Jan. 5, 1926.

1,568,821

UNITED STATES PATENT OFFICE.

EUGENE A. FLORENCE, OF SAN SIMEON, CALIFORNIA.

SELF-LOCKING NUT.

Application filed August 19, 1925. Serial No. 51,241.

*To all whom it may concern:*

Be it known that I, EUGENE A. FLORENCE, a citizen of the United States, residing at San Simeon, in the county of San Luis Obispo and State of California, have invented new and useful Improvements in Self-Locking Nuts, of which the following is a specification.

My present invention has reference to a simple, and cheaply constructed means for effectively locking a nut on a bolt when the nut has been screwed home on the bolt.

A further object is the provision of a locking means for nuts, comprising cam-shaped dogs let in pockets on the inner face of the nut and finding a fulcrum on the inner walls of the pockets, whereby the outer and pointed ends of the dogs will be projected when the nut is being screwed home on the bolt and when the said dogs are brought into contact with a superstructure connected by the nut and bolt the same will be canted to bring their active ends into biting engagement with the threads of the bolt and thereby effectively lock the nut from accidental turning on the bolt.

To the attainment of the foregoing the improvement resides in the construction, combination and operative association of parts such as is disclosed by the drawings which accompany and which form part of this application.

In the drawings:—

Figure 1:
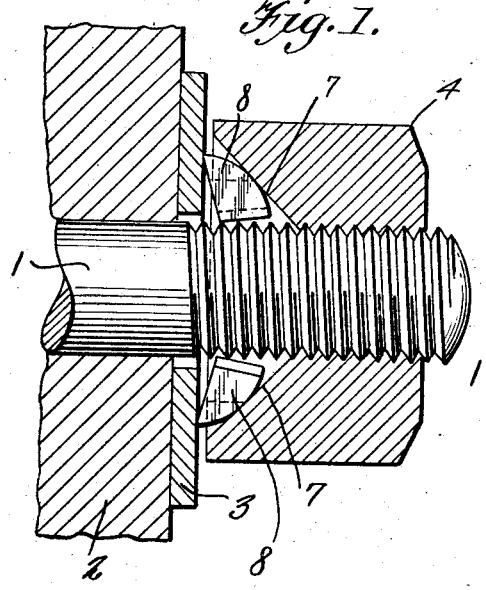
Figure 1 is a view with parts in section, illustrating the arrangement of parts when the nut is being screwed home on the bolt.

When a bolt 1 is passed through a wooden structure 2 on one face of the said structure is a metal plate 3. When the bolt connects a metal superstructure the employment of the plate 3 is not required. The bolt 1, of course, passes through the plate 3.

Engaging the threaded end of the bolt 1 there is a nut 4 of the usual construction. This nut has its inner face at diametrically opposite points, provided with pockets that intersect the bore of the nut. The pockets have their inner portions of substantially rectangular formation, as indicated by the numeral 5, while the outer portions of the walls of the pockets are flared away from each other, as at 6. The inner walls of the pockets are beveled, as at 7.

Designed to be received in each of the pockets there is a dog 8. Each dog has an inner rounded edge 9, a lower beveled edge providing a sharpened corner 10 and its outer edge arranged at an obtuse angle with respect to the edge 10. The last mentioned edge, 11, at its juncture with the rounded edge 9 is of course pointed.

Figure 2:
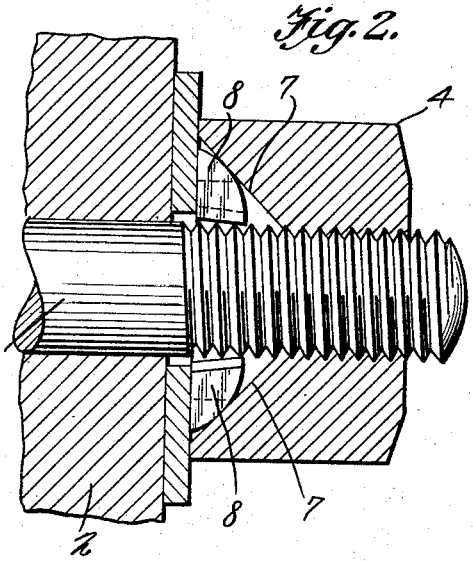
Figure 2 is a similar view but showing the nut screwed home on the bolt.
Figure 3:
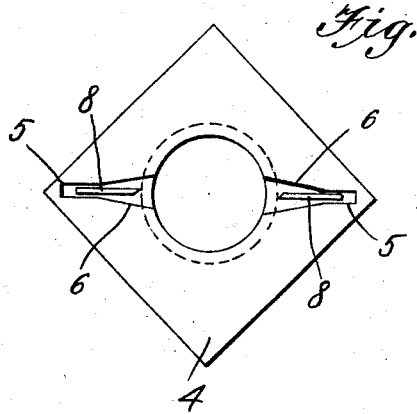
Figure 3 is an inner face view of the nut with the locking dogs pocketed therein.
Figure 4:
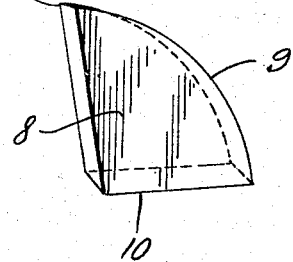
Figure 4 is a perspective view of one of the locking dogs.

By reference to Figure 1 of the drawings it will be noted that the rounded edges 9 of the dogs contacting with the inclined inner walls 7 of the pockets will cause the canting of the dogs so that the referred to pointed edge, 11, is disposed outward of the pocket. Because of the beveled edge 10 the nut may be freely screwed home on the bolt. When the nut is screwed fully home the edge 10 will contact with the plate 3 of the superstructure. This cants the dogs, bringing the same fully into the pockets as disclosed by Figure 2 of the drawings and when in such positions the sharpened edges 10 of the said dogs will effect a biting engagement on the threads of the bolt 1.

By providing the pockets with the inclined or flared side walls 6, the locking dogs 8 are permitted lateral movement in the pockets. This permits of the nut being screwed entirely home before being positively locked on the bolt. This also permits of the employment of dogs of different lengths or for the taking up of any excess length that may occur in the outer ends of the dogs.

Having described the invention, I claim:—

A means for locking a nut on a bolt in which said bolt is passed through a superstructure, said nut having its inner face provided with oppositely arranged pockets whose inner side walls are parallel but whose outer side walls are beveled away from each other and whose inner walls are arranged at an inclination, a dog adapted to be received in each pocket, each of said dogs having an inner rounded edge, a lower beveled edge and an outer edge which is arranged at an outward angle from the beveled edge, the rounded edge of the dog designed to be fulcrumed on the inner inclined walls of the pocket and whereby the pointed corner between the last mentioned and rounded edge of the dogs will be projected through the pockets when the nut is screwed on the bolt and will be contacted by the superstructure and canted to bring the beveled edge of the dogs into biting engagement with the threads of the bolt when the nut is fully screwed home.

In testimony whereof I affix my signature.

EUGENE A. FLORENCE.